Jan. 21, 1964 W. H. HASTY 3,118,647
VALVE ASSEMBLY
Filed Feb. 15, 1962 2 Sheets-Sheet 2
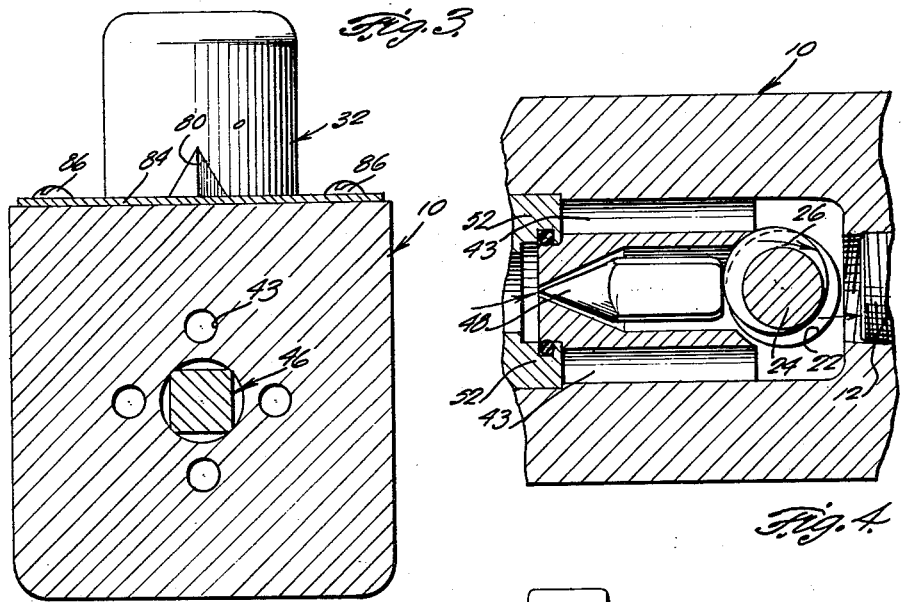
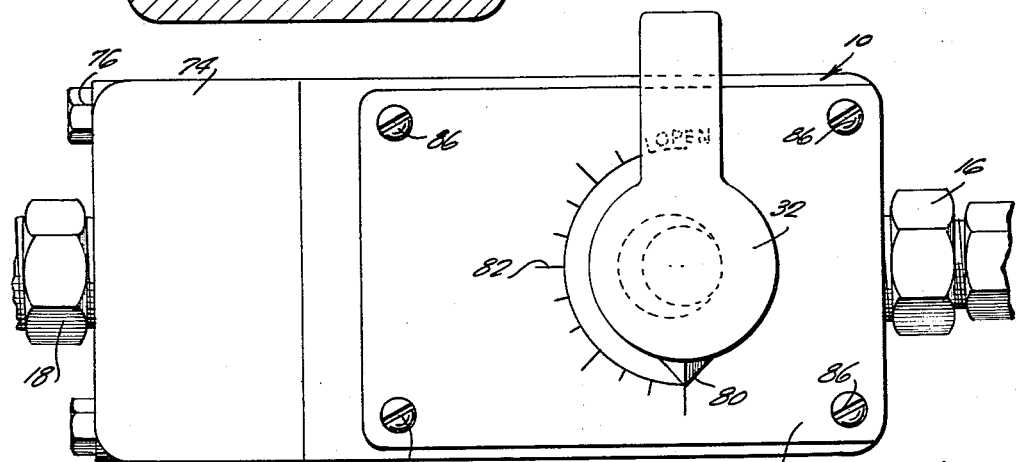
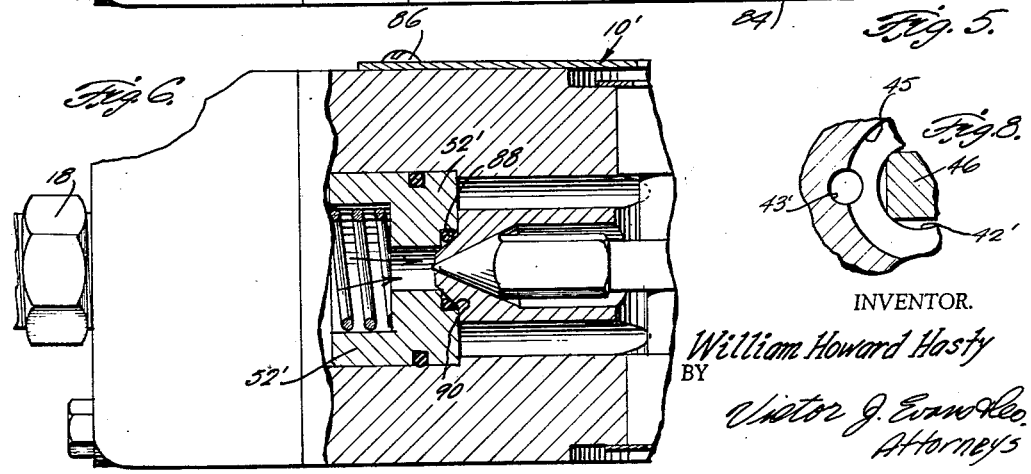
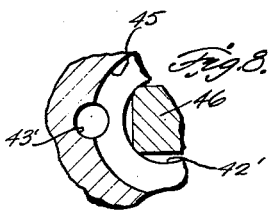
INVENTOR.
William Howard Hasty
BY
Victor J. Evans & Co.
Attorneys

# 3,118,647
VALVE ASSEMBLY
William Howard Hasty, 128 S. 10th St., Olean, N.Y.
Filed Feb. 15, 1962, Ser. No. 173,455
1 Claim. (Cl. 251—65)

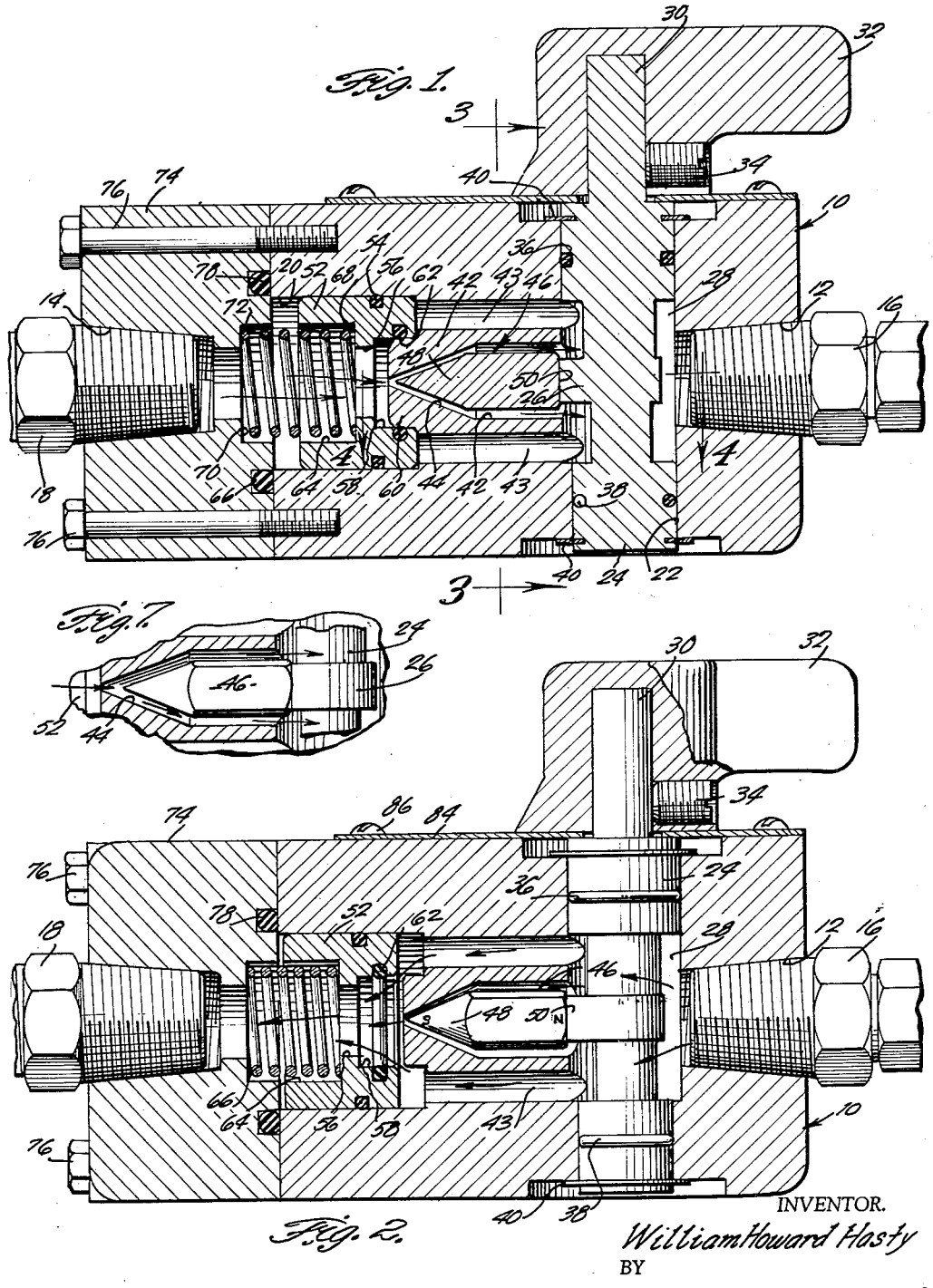

The present invention relates to valve assemblies generally and in particular to an improved valve for liquids or gases.

An object of the present invention is to provide a novel valve assembly structure having means for obviating or lessening chatter when the valve is in opened position.

Another object of the present invention is to provide a valve assembly, including therein a check valve, which is economical to manufacture, one which is foolproof in operation, and one which is highly effective in action.

A further object of the present invention is to provide a valve assembly having novel means for connecting a valve element to a cam on a valve stem, such means preventing vibration of the valve element due to the passage of water or gas thereover.

These and other objects and advantages of the present invention will be fully apparent from the following description taken in connection with the annexed drawings, in which:

FIGURE 1 is a sectional view of the valve assembly of the present invention, shown in a partially opened condition, FIGURE 2 is a view similar to FIGURE 1 showing the valve assembly in a condition in which the check valve thereof is moved from its closed position by the force of water or gas received from the inlet, FIGURE 3 is a view taken on the line 3—3 of FIGURE 1, FIGURE 4 is a view taken on the line 4—4 of FIGURE 1, FIGURE 5 is a top plan view of the valve assembly of the present invention, FIGURE 6 is a fragmentary view partly in section, with a portion broken away, of a modification of the present invention, FIGURE 7 is a fragmentary view showing the valve in open condition, and FIGURE 8 is a fragmentary view of a modification of the invention.

With reference to the drawings in detail in which like numerals indicate like parts throughout the several views, the valve assembly of the present invention consists in a housing 10 having an inlet 12 at one end and an outlet 14 at the other end.

A pipe nipple 16 is threadedly engaged in the inlet 12 and another nipple 18 is threadedly engaged in the outlet 14.

The housing 10 is provided with a chamber 20 intermediate the ends thereof and connecting in communication with the outlet 14.

A transversely arranged bore 22 bisects the housing 10 intermediate the ends thereof and carries therein a cylindrical valve activator or stem 24.

The valve stem 24 carries on its midportion a cam 26 arranged eccentrically with the longitudinal axis of the valve stem 24.

The valve stem 24 is provided on each side of the cam 26 with a passage 28 connecting in communication the inlet 12 with the chamber 20.

The valve stem 24 has a reduced portion 30 on one end thereof which forms a support for a handle 32. A set screw 34 secures the handle 32 to the valve stem portion 30. Sealing rings 36 and 38 are circumposed about the portion of the valve stem 24 within the bore 22 and seal the passage 28 against leakage out of the ends of the bore 22. C-rings 40 on each end of the large portion of the valve stem 24 secure the valve stem 24 against longitudinal movement with respect to the housing 10.

The housing 10 is provided with a bore 42 arranged longitudinally and having one end connected in communication with the passage 28 and having the other end connected in communication with the chamber 20. Circumposed about and spaced from the bore 42 are bores 43 also connecting the passage 28 with the chamber 20.

The portion of the bore 42 adjacent the chamber 20 is provided with a conical valve seat 44. Within the bore 42 is a valve element 46 having the portion adjacent one end tapered and conformably shaped to fit the valve seat 44.

The other end of the valve element 46, as at 50, bears against the cam 26.

Preferably, the valve element 46 is a magnet and the cam 26 is fabricated of a magnetically attractive material. The housing 10 and the valve seat 44 are formed of a non-magnetic material.

This permits the cam 26 to draw the valve element 46 in the bore 42 responsive to rotary movement of the valve stem 24.

Another important feature of the invention resides in the provision of a check valve 52 slidable in the chamber 20. The check valve 52 carries a sealing ring 54 adjacent one end in sliding engagement with the inner wall of the chamber 20. A bore 56 extends longitudinally through the check valve 52 and has an enlarged portion 58 adjacent one end.

The portion of the housing 10 surrounding the bore 42 adjacent the chamber 20 is provided with a nose 60 which is received in the bore enlarged portion 58 upon sliding movement of the check valve 52 in the chamber 20. A sealing ring 62 extends about the inner wall of the bore portion 58 and engages the exterior of the nose 60 to seal, in cooperation with the sealing ring 54, the passages 43 when the check valve 52 is in the position shown in FIGURE 1 in the right hand end of the chamber 20.

The check valve 52 is provided in the end remote from the portion 58 with another enlarged portion 64. A spring 66 has one end bearing against the portion 58 of the check valve 52 between the bore portion 64 and the bore 56. The other end of the spring 66 bears against the bottom 70 of a shallow bore 72 provided in a closure member 74 forming a part of the housing 10 and secured to the remaining portion of the housing 10 by bolts 76.

A sealing ring 78 is seated in an annular groove provided on the face of the member 74 adjacent the remaining portion of the housing 10 and seals the member 74 to the remaining portion of the housing 10.

The handle 32 is provided with a pointer 80 which cooperates with indicia 82 etched or printed on the top of the housing 10.

Preferably, a plate 84, as in FIGURE 2, is secured to the top of the housing 10 by screws 86 and forms a base for the indicia 82.

With reference to FIGURE 6, there is shown a modified form of the invention in which the housing 10' has a nose 60' and a check valve 52' is provided with a sealing ring 88 on a tapered face 90, the ring 88 bearing against the nose 60' when the check valve 52' is in the closed position.

In operation, when the handle 32 is in the closed position, as in FIGURE 5, the cam 26 bears against the end 50 of the valve element 46 and forces the valve element to the position in which the tapered portion 48 is seated on the valve seat 44. This closes the flow of liquid or gas from the inlet 12 to the outlet 14 except when the pressure of the liquid or gas exceeds the tension of the spring 66. Such increase in pressure will force the check valve 52 off the position in which the nose 60 is received within the reduced bore portion 58.

Normally the check valve 52 serves to prevent the flow of liquid from the outlet 14 into the housing 10 unless the valve element 64 is in the opened position.

Upon turning of the handle 32 to the open position, as indicated by the pointer 80 and indicia 82, the magnetically attractive cam 26 will serve to draw the magnetic valve element 46 from its position seated on the valve seat 44 to the opened position as shown in FIGURE 7.

In FIGURE 8, a modified form of the invention is shown in which the bores 43' are connected to the bore 42' by means of an annular passage 45. This serves to increase the flow of fluid through the housing 10.

While only preferred embodiments of the present invention are shown other embodiments are contemplated and many changes and modifications may be made in the invention without departing from the spirit thereof as set forth in the appended claim.

What is claimed is:

In a valve assembly including a housing having an inlet and an outlet, there being a bore in said housing extending longitudinally between said inlet and outlet, said bore having one end connected in communication with said outlet and having the other end connected in communication with said inlet, a valve seat in said one end of said bore, a valve element longitudinally movable in said bore between open and closing position with respect to said valve seat, a rotatable valve actuator extending into said bore adjacent said bore other end, and an eccentric cam on the portion of said actuator adjacent said valve element, said valve element being a magnet and said cam being of magnetic material so that said valve element has one end thereof in sliding contact with the surface of said cam and is movable in said bore responsive to execution of rotary movement of said stem.

References Cited in the file of this patent

UNITED STATES PATENTS

| | | |
|---|---|---|
| 1,855,667 | Davis | Apr. 26, 1932 |
| 2,693,933 | Meinke | Nov. 9, 1954 |

FOREIGN PATENTS

| | | |
|---|---|---|
| 497,842 | Italy | Sept. 24, 1954 |